(12) United States Patent
Yamaoka

(10) Patent No.: US 10,133,066 B2
(45) Date of Patent: Nov. 20, 2018

(54) HEAD-UP DISPLAY APPARATUS

(71) Applicant: DENSO CORPORATION, Kariya, Aichi-pref. (JP)

(72) Inventor: Ryo Yamaoka, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 55 days.

(21) Appl. No.: 14/888,476

(22) PCT Filed: May 12, 2014

(86) PCT No.: PCT/JP2014/002483
§ 371 (c)(1),
(2) Date: Nov. 2, 2015

(87) PCT Pub. No.: WO2014/185046
PCT Pub. Date: Nov. 20, 2014

(65) Prior Publication Data
US 2016/0170205 A1 Jun. 16, 2016

(30) Foreign Application Priority Data
May 14, 2013 (JP) ................... 2013-102008

(51) Int. Cl.
*G02B 27/14* (2006.01)
*G02B 27/01* (2006.01)
(Continued)

(52) U.S. Cl.
CPC .......... *G02B 27/0101* (2013.01); *B60K 35/00* (2013.01); *B60R 1/00* (2013.01);
(Continued)

(58) Field of Classification Search
CPC ..... B60K 35/00; B60R 1/00; B60R 2300/205; G02B 2027/0112; G02B 2027/0118;
(Continued)

(56) References Cited

U.S. PATENT DOCUMENTS 5,864,432 A * 1/1999 Deter ................ G02B 27/01
345/7
9,549,170 B2 * 1/2017 Yi ................ H04N 13/0447
(Continued)

FOREIGN PATENT DOCUMENTS

| JP | 2000131682 A | 5/2000 |
|---|---|---|
| JP | 2004251881 A | 9/2004 |

(Continued)

OTHER PUBLICATIONS

International Search Report and Written Opinion (in Japanese with English Translation) for PCT/JP2014/002483, dated Jul. 29, 2014; ISA/JP.

*Primary Examiner* — William Choi
*Assistant Examiner* — Vipin Patel
(74) *Attorney, Agent, or Firm* — Harness, Dickey & Pierce, P.L.C.

(57) ABSTRACT

A head-up display apparatus includes an image display surface that displays a color image by multiple pixels, each of the pixels being divided into sub-pixels. The color image displayed on the image display surface is projected to a transparent plate member provided in front of a driver seat, and the color image is displayed superimposed to a forward scenery of the transparent plate member. The image display surface includes a first region including a center position, and a second region other than the first region. Each of the pixels in the first region includes a sub-pixel displaying red, a sub-pixel displaying green, and a sub-pixel displaying blue. Each of the pixels in the second region includes multiple sub-pixels including a sub-pixel displaying color having a color phase biased to at least one direction of a red direction, a green direction, and a blue direction.

6 Claims, 10 Drawing Sheets

(51) Int. Cl.
*B60K 35/00* (2006.01)
*B60R 1/00* (2006.01)

(52) U.S. Cl.
CPC ........ *G02B 27/01* (2013.01); *B60R 2300/205* (2013.01); *G02B 2027/0112* (2013.01); *G02B 2027/0118* (2013.01); *G02B 2027/0141* (2013.01)

(58) Field of Classification Search
CPC ............ G02B 2027/0141; G02B 27/01; G02B 27/0101; G11C 5/14; H01M 10/0525; H01M 2/162; H01M 2/166; H01M 2/1686; H01M 4/131
USPC ......................................................... 359/630
See application file for complete search history.

(56) References Cited

U.S. PATENT DOCUMENTS

| | | | |
|---|---|---|---|
| 2003/0160916 A1* | 8/2003 | Nakagawa | ........ G02F 1/133514 349/106 |
| 2006/0017371 A1* | 1/2006 | Yamada | .............. H01L 27/3206 313/498 |
| 2006/0017671 A1 | 1/2006 | Yamada | |
| 2009/0059341 A1* | 3/2009 | Kinugawa | ............ G09G 3/3648 359/245 |

FOREIGN PATENT DOCUMENTS

| | | |
|---|---|---|
| JP | 2006038986 A | 2/2006 |
| JP | 2009075547 A | 4/2009 |
| JP | 2010009081 A | 1/2010 |

\* cited by examiner

HEAD-UP DISPLAY APPARATUS

CROSS-REFERENCE TO RELATED APPLICATIONS

This application is a U.S. National Phase Application under 35 U.S.C. 371 of International Application No. PCT/JP2014/002483 filed on May 12, 2014 and published in Japanese as WO 2014/185046 A1 on Nov. 20, 2014. This application is based on and claims the benefit of priority from Japanese Patent Application No. 2013-102008 filed May 14, 2013. The entire disclosures of all of the above applications are incorporated herein by reference.

TECHNICAL FIELD

The present disclosure relates to a head-up display apparatus that displays an image for a driver to project the image to a transparent plate member disposed in front of a driver seat.

BACKGROUND ART

A head-up display apparatus (hereinafter referred to as a HUD apparatus) projects an image to a transparent plate member disposed in front of a driver seat (for example, a windshield or a combiner) to provide the driver with various information. In the HUD apparatus, an image is displayed when the image is superimposed to a forward scenery seen through the transparent plate member, and the driver recognizes various information even when the driver is looking at the front.

The HUD apparatus displays an image (a warning image) that warns an approach of an obstacle to a driver who is driving a vehicle, or an image (an alert image) that draws attention (referring to patent literature 1). According to the HUD apparatus, the image is displayed in a field of view of the driver during driving. When the warning image or the alert image is displayed, it is considered that the driver recognizes the image immediately.

The inventor of the present application has found the following regarding the HUD apparatus. In the proposed technique, even when the warning image or the alert image is displayed, the driver may be difficult to be aware of being warned or alerted actually. It is postulated that a HUD apparatus displays an image while being superimposed to a forward scenery. Therefore, even when the warning image or the alert image is displayed, the forward scenery is seen through in the same manner as that when another general image is displayed. Therefore, the driver may be difficult to be aware of the image displayed for warning or alert.

PRIOR ART DOCUMENT

Patent Document
  Patent literature 1: JP 2004-251881 A

SUMMARY OF THE INVENTION

It is an object of the present disclosure to provide an HUD apparatus that displays an image in a mode where the driver is immediately aware that the image is displayed for warning or alert to the driver.

A head-up display apparatus according to one aspect of the present disclosure includes an image display surface that displays a color image by multiple pixels, each of the pixels being divided into sub-pixels. The color image displayed on the image display surface is projected to a transparent plate member that is provided in front of a driver seat, and the color image is displayed superimposed to a forward scenery of the transparent plate member. The image display surface includes a first region including a center position of the image display surface, and a second region excluding the first region. Each of the pixels in the first region includes a sub-pixel displaying red, a sub-pixel displaying green, and a sub-pixel displaying blue. Each of the pixels in the second region includes multiple sub-pixels that include a sub-pixel that displays color having a color phase biased to at least one direction of a red direction, a green direction, and a blue direction as compared with each of the pixels in the first region.

According to the head-up display apparatus, since each pixel of the first region includes sub-pixels that display red, green, and blue corresponding to three primary colors of a light, it may be possible to display many colors by mixing those three primary colors. An unused sub-pixel may be liable to be generated, and an image high in luminance may be hard to be obtained. For example, when yellow is displayed, the sub-pixel that displays red and the sub-pixel that displays green are illuminated to display yellow. In this case, the sub-pixel that displays blue is not used, and the image high in luminance may be difficult to obtain. By contrast, each pixel in the second region includes the sub-pixels that display the colors having a color phase biased in at least one direction of a red direction, a green direction, and a blue direction as compared to each pixel in the first region. The kinds of colors to be displayed are reduced as compared with the first region. When the color in the direction along which the color phase is biased is displayed, since the unused sub-pixel may be unlikely to be generated, it may be possible to display the image high in luminance in the second region. Therefore, in displaying the image for warning or alert to the driver, the image high in luminance is displayed in the second region, and the image is projected to the transparent plate member in front of the driver seat. According to this configuration, since the image is displayed in a mode clearly different from a case when the image displayed in the first region is projected, it may be possible for the driver to be immediately aware that the image is displayed for any warning or alert.

BRIEF DESCRIPTION OF THE DRAWINGS

The above and other aspects, features and advantages of the present disclosure will become more apparent from the following detailed description made with reference to the accompanying drawings. In the drawings.

PREFERRED EMBODIMENTS FOR CARRYING OUT THE INVENTION

Embodiments will be described to clarify the content of the present disclosure.

(Apparatus Configuration)

Figure 1A:
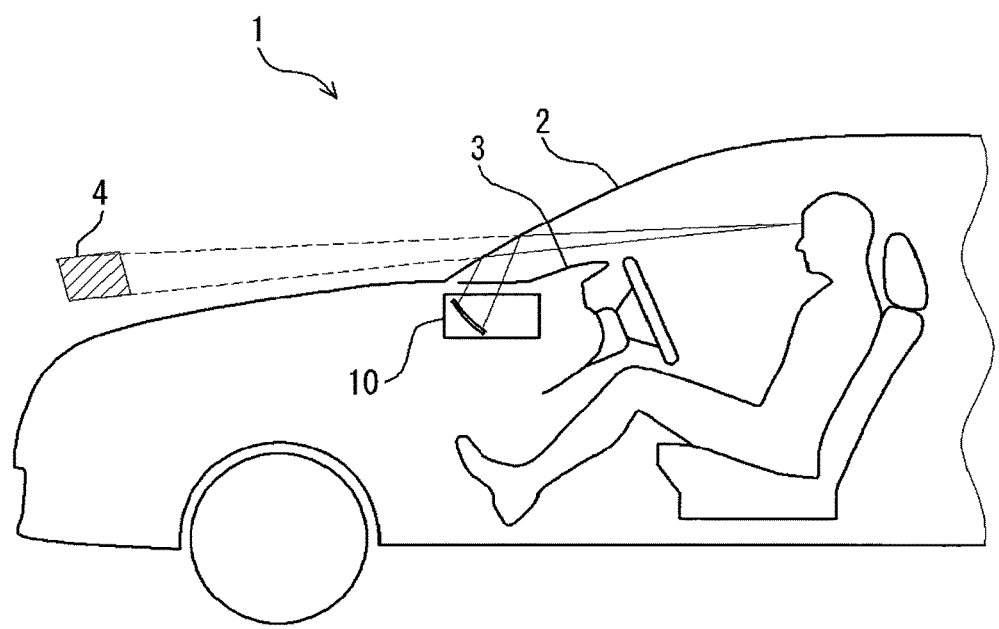
FIG. 1A is a diagram illustrating a vehicle mounted with a head-up display apparatus.

FIG. 1A illustrates a head-up display apparatus (hereinafter, referred to as a HUD apparatus) 10 according to the present embodiment mounted to a vehicle 1. As illustrated in FIG. 1A, the head-up display apparatus (hereinafter, referred to as a HUD apparatus) 10 according to the present embodiment is mounted in a dashboard 3 in front of the vehicle 1 when viewed from a driver seat. The HUD apparatus 10 projects an image toward a windshield 2. The light projected from the HUD apparatus 10 is reflected on the windshield 2, and reaches the eyes of a driver. The driver recognizes a virtual image of the projected image as a display image 4 that is visible across the windshield 2.

The windshield 2 in the present embodiment corresponds to a plate member in the present disclosure.

Figure 1B:
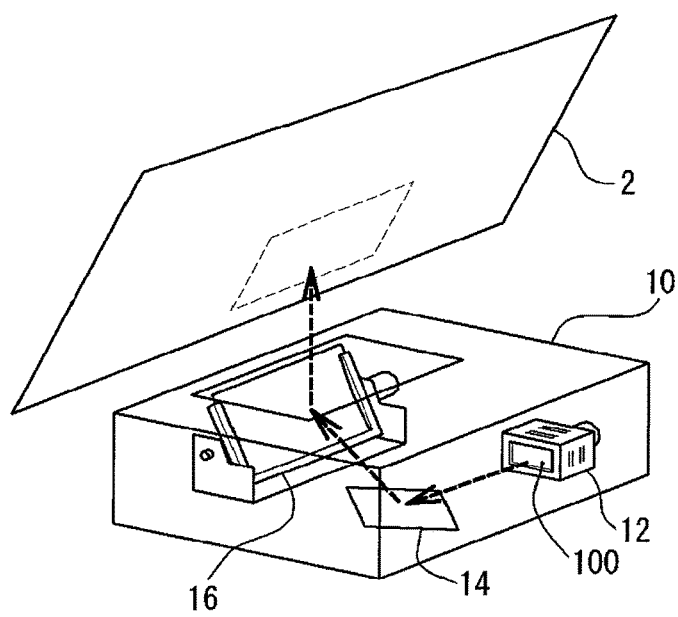
FIG. 1B is a diagram illustrating a structure of the head-up display apparatus.

As illustrated in FIG. 1B, the HUD apparatus 10 in the present embodiment includes an image projection unit 12, a plane mirror 14, and a concave mirror 16. The image projection unit 12 displays an image on an image display surface 100, and projects the display image. The plane mirror 14 reflects the image projected from the image projection unit 12. The concave mirror 16 reflects the image reflected by the plane mirror 14, and projects the image to the windshield 2.

The image display surface 100 of the image projection unit 12 is a known liquid crystal display screen having color filters. The image display surface 100 displays various color images on the screen. When a backlight emits a light to the image display surface 100 from a rear side of the image projection unit 12 while the color image is displayed on the liquid crystal display screen, the displayed color image is projected toward the plane mirror 14.

Figure 2:
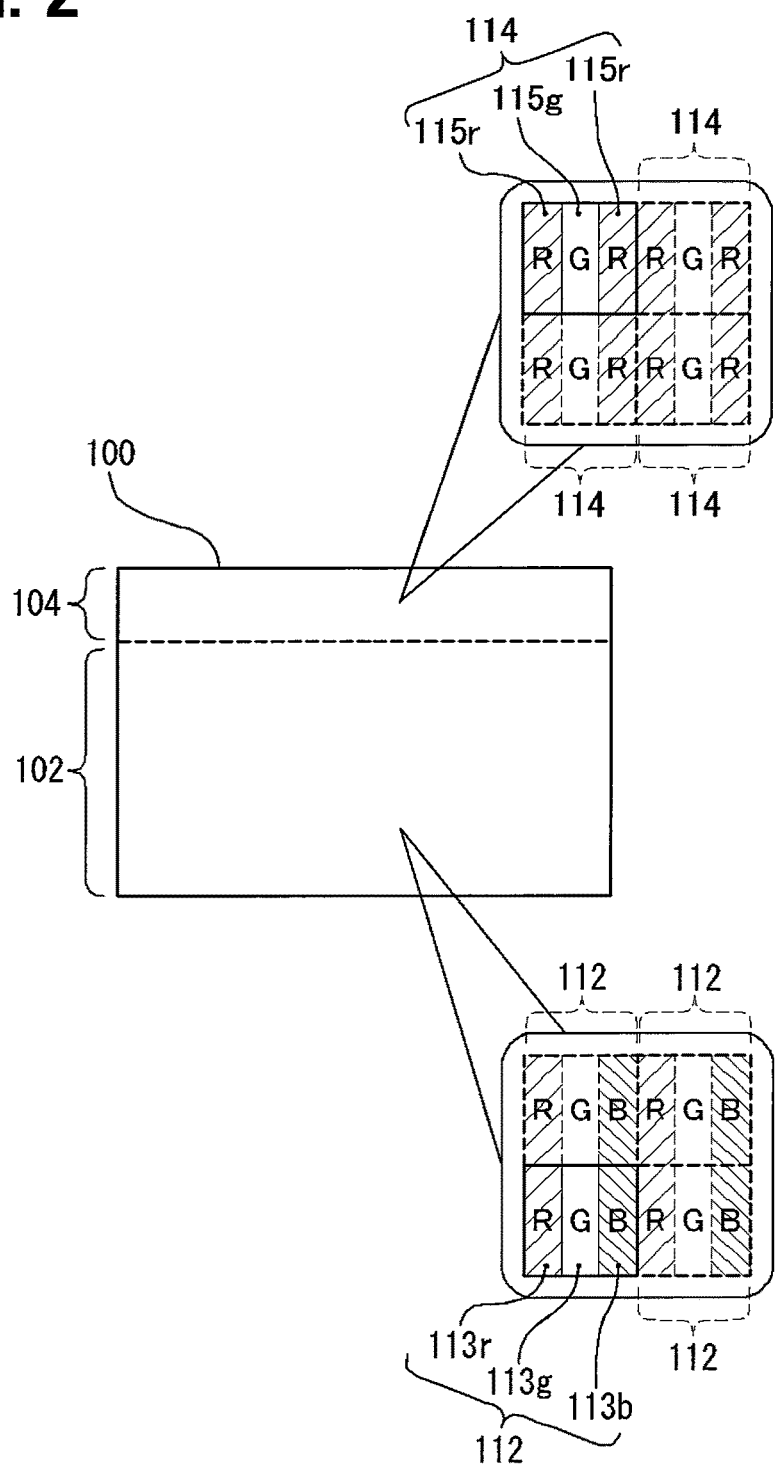
FIG. 2 is a diagram illustrating an arrangement of a sub-pixel in a first region and a second region of an image display surface according to the present embodiment.

FIG. 2 illustrates that the image display surface 100 in the present embodiment is viewed from a front of the image display surface 100. As shown in FIG. 2, the image display surface 100 in the present embodiment is divided into a first region 102 and a second region 104. The first region 102 includes a center portion of the screen, and occupies a most part of the screen. The second region 104 is disposed on an upper end of the screen. In each of the first region 102 and the second region 104, multiple pixels are arranged two-dimensionally, and each of the pixels is provided by three sub-pixels.

Each of the sub-pixels is provided with a color filter that transmits any light of red, green, and blue. Red, green, and blue correspond to three primary colors of the light. Each of the sub-pixels displays any one color of red, green, and blue. An array of the color filters disposed in the respective sub-pixels is different between the pixels in the first region 102 and the pixels in the second region 104. An array of colors of the sub-pixels in each of the pixels is different between the first region 102 and the second region 104.

Among multiple pixels 112, 114, the first region 102 includes the pixel 112. The second region 104 includes a pixel 114 among the multiple pixels 112, 114. The pixel 112 in the first region 102 may also be referred to as a first pixel 112. The pixels 114 in the second region 104 may also be referred to as a second pixel 114.

FIG. 2 displays an area of four pixels from each of the first region 102 and the second region 104. FIG. 2 illustrates the array of colors displayed by the sub-pixels in each of the pixels.

The first region 102 will be described. A sub-pixel 113r, a sub-pixel 113g, and a sub-pixel 113b are arrayed in each pixel 112 in the first region 102 in this order. The sub-pixel 113r is provided with a color filter (hereinafter, referred to as a color filter R) that transmits red. The sub-pixel 113g is provided with a color filter (hereinafter, referred to as a color filter G) that transmits green. The sub-pixel 113b is provided with a color filter (hereinafter, referred to as a color filter B) that transmits blue. When it is unnecessary to distinguish these color filters from each other, the sub-pixels 113r, 113g, and 113b in the first region 102 may be referred to merely as a sub-pixel 113.

Each pixel 114 in the second region 104 has two sub-pixels 115r each provided with a color filter R, and one sub-pixel 115g provided with a color filter G. With respect to the array of the colors in the sub-pixels 115r with the color filter R and the sub-pixel 115g with the color filter G within each of the pixels 114, the sub-pixel at a position of each sub-pixel 113b with the color filter B in the first region 102 is replaced with the sub-pixel 115r having the color filter R. Incidentally, in the second region 104, when it is unnecessary to distinguish the provided color filters from each other, the sub-pixels 115r, 115g in the second region 104 may be referred to merely as a sub-pixel 115.

(Display Example of Image)

Figure 3A:
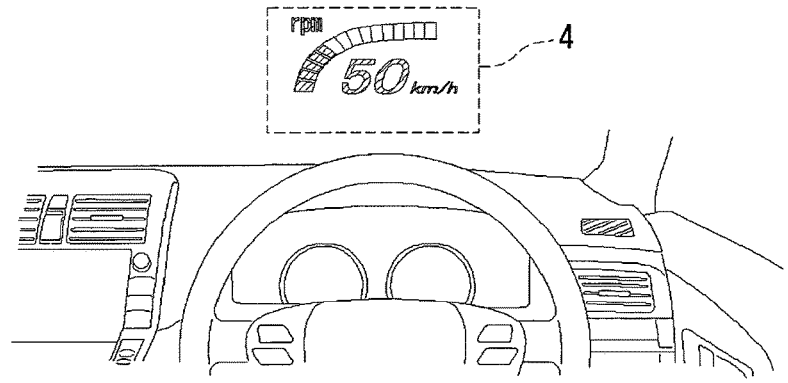
FIG. 3A is a diagram illustrating a first illustrative view exemplifying an alert image and a warning image displayed in the head-up display apparatus according to the present embodiment.
Figure 3B:
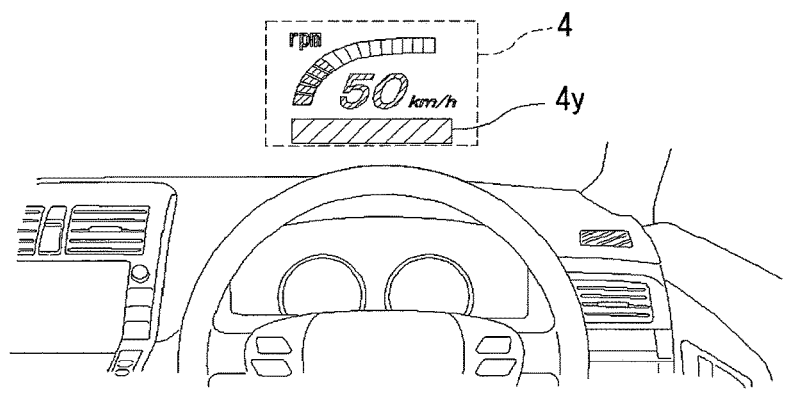
FIG. 3B is a diagram illustrating a second illustrative view exemplifying an alert image and a warning image displayed in the head-up display apparatus according to the present embodiment.
Figure 3C:
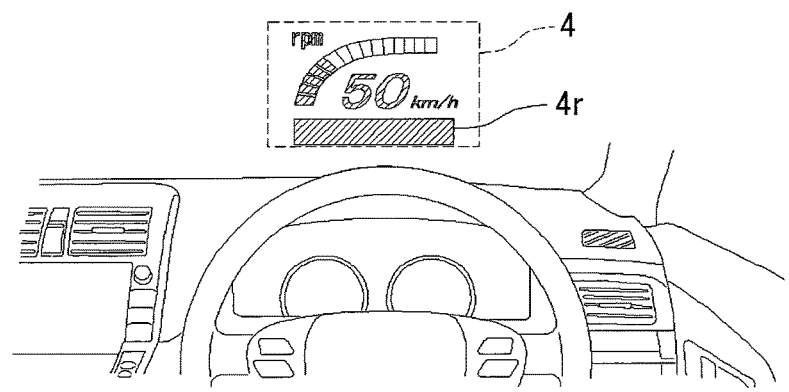
FIG. 3C is a diagram illustrating a third illustrative view exemplifying an alert image and a warning image displayed in the head-up display apparatus according to the present embodiment.

FIG. 3A, FIG. 3B, and FIG. 3C illustrate the display image 4 displayed by the HUD apparatus 10 having the image display surface 100 according to the present embodiment.

In a normal travel state, the image mainly displayed in the first region 102 of the image display surface 100 is projected to the windshield 2, and the display image 4 illustrated in FIG. 3A is displayed. As described in FIG. 2, each pixel 112 in the first region 102 includes the sub-pixel 113r provided with the color filter R for displaying red, the sub-pixel 113g provided with the color filter G for displaying green, and the sub-pixel 113b provided with the color filter B for displaying blue. Therefore, in the first region 102 of the image display surface 100, a color image having various colors is displayed by mixing red, green, and blue with each other. The display image 4 having various colors is displayed with the projection of the image in the first region 102 to the windshield 2.

In FIG. 3B, a yellow alert image 4y for drawing attention of the driver is displayed in addition to the image displayed during a normal travel. Each pixel 114 in the second region 104 of the image display surface 100 includes the sub-pixels 115r provided with the color filter R for displaying red, and the sub-pixel 115g provided with the color filter G for displaying green. Therefore, the second region 104 displays not only the red image and the green image, but also the yellow image obtained by mixing red and green together. The yellow alert image 4y is displayed with the projection of the yellow image displayed in the second region 104 to the windshield 2.

In FIG. 3C, a red warning image 4r for warning the driver is displayed instead of the yellow alert image 4y for drawing attention of the driver. As described in FIG. 2, each pixel 114 in the second region 104 of the image display surface 100 includes the two sub-pixels 115r provided with the color filter R for displaying red in each pixel 114. Therefore, the red image being high luminance that cannot be displayed in the first region 102 is displayed by displaying red using the two sub-pixels 115r. The red image having the high luminance is projected to the windshield 2, and displays the warning image 4r as illustrated in FIG. 3C. Therefore, even when the forward scenery seen through the windshield 2 is bright, the warning image 4r is displayed with a sufficient brightness without difficulty to see due to the bright scenery. Since the warning image 4r is displayed in a mode where the warning image 4r is clearly visible almost without show-through of the forward scenery unlike the normal image displayed in the first region 102, it may be possible for the driver to immediately recognize that the warning image 4r is displayed.

In the yellow alert image 4y illustrated in FIG. 3B, when red of the two sub-pixels 115r is mixed with green of the sub-pixel 115g for display, a yellow image having the high luminance that cannot be displayed in the first region 102 is displayed. Therefore, when the yellow image is displayed in this manner, the yellow alert image 4y is displayed with a sufficient brightness competitive to the bright scenery. Since the alert image 4y is displayed in a mode where the alert image 4y is clearly visible almost without seeing through the forward scenery unlike the normal image displayed in the first region 102, it may be possible for the driver to immediately recognize that the alert image 4y is displayed.

Incidentally, a sub-pixel 115 for displaying blue is not provided in each pixel 114 of the second region 104, and the sub-pixels 115r for displaying red and the sub-pixel 115g for displaying green are disposed. The second region 104 cannot display an image of blue or a color obtained by mixture of blue, but an image of red, green and a color obtained by mixing red and green together such as yellow are displayed. Therefore, when it is unnecessary to display the alert image 4y and the warning image 4r, the normal image displayed in the first region 102 may be displayed in the second region 104.

(Filter Characteristic)

In the second region 104, since two sub-pixels 115r for displaying red are disposed for one pixel 114, red is displayed with a sufficiently high luminance. Therefore, in the HUD apparatus 10 according to the present embodiment, the characteristic of the color filter R provided in the sub-pixels 115r of the second region 104 is set to a characteristic different from the color filter R provided in the sub-pixel 113r of the first region 102.

Figure 4:
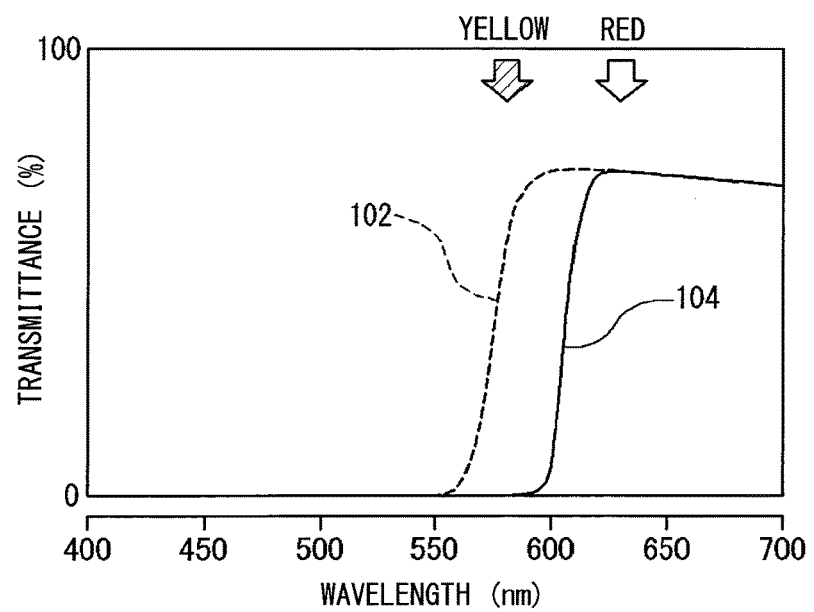
FIG. 4 is a diagram illustrating an illustrative view illustrating characteristics of a color filter in the first region and the second region of the image display surface in comparison with each other.

FIG. 4 illustrates a transmittance to a wavelength of the light in the color filter R provided in the sub-pixel 113r of the first region 102, and the color filter R provided in the sub-pixel 115r of the second region 104.

The transmittance of the color filter R for the second region 104 indicated by a solid line in FIG. 4 is high in a wavelength longer than about 600 nm, but is rapidly lowered in the wavelength shorter than about 600 nm. In general, since a human perceives red when the light of the wavelength longer than 600 nm enters the eyes, the light transmitted by the color filter R for the second region 104 becomes red light.

The transmittance of the color filter R for the first region 102 as indicated by a dashed line in FIG. 4 is not lowered in the wavelength around the 600 nm, and is rapidly lowered in the vicinity of the wavelength that is felt yellow by the human. The color filter R for the first region 102 is set to this characteristic. Thus, not only pure red light, but also slightly yellow tinged red light is transmitted by the filter and the image in luminance as high as possible is displayed. The red image displayed in the first region 102 becomes a vermilion image in which the pure red light is mixed with the slightly yellowish red light.

Near-vermilion red is displayed in the first region 102 since the luminance of the image is enhanced. It may be desirable to display the pure red (for example, red high in saturation). Especially, it may be desirable that the warning image 4r illustrated in FIG. 3C is displayed with pure (in other words, visually clear feeling) red rather than a case in which the warning image 4r is displayed with red such as vermilion, since the driver may be likely to be aware of being warned.

From this viewpoint, since the red light is displayed with the sufficiently high luminance in the second region 104 of the HUD apparatus 10, it is unnecessary to transmit the yellowish red light to enhance the luminance.

The color filter R used in the second region 104 has a characteristic indicated by the solid line in FIG. 4. The pure red image is displayed in the second region 104, and the pure red (therefore visually clear feeling) warning image 4r is displayed with the projection of the image to the windshield 2. Since the image is displayed with the sufficient luminance to an extent that hardly sees through the forward scenery, and since the image is displayed with the pure red with that the driver is likely to be aware of being warned, it may be possible for the driver to be immediately aware that the warning image 4r is displayed.

(Modifications)

There may be various modifications in the HUD apparatus 10 according to the present embodiment. Differences of the present embodiment from modifications will be mainly described. In the following modifications, the similar configurations as those in the present embodiment are denoted by identical reference numerals, and a detailed description of the similar configurations will be omitted.

(First Modification)

In the above embodiment, when the array of the colors in each pixel 112 of the first region 102 is compared with the array of the colors in each pixel 114 of the second region 104, the blue sub-pixel 113b in the first region 102 is replaced with the red sub-pixel 115r in the second region 104. When the array of the colors in the second region 104 approaches to red as a whole as compared with the array of the colors in the first region 102 where the three colors of red, green, and blue are arranged, the blue sub-pixel 113b in the first region 102 may not be replaced with the red sub-pixels 115r in the second region 104, as the array of the colors.

FIG. 5A to FIG. 5D illustrate an array of colors in the pixel 114 of a second region 104 according to a first modification.

Figure 5A:
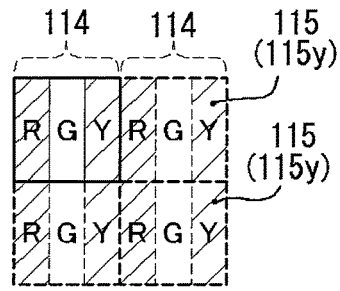
FIG. 5A is a diagram illustrating a first illustrative view of a first modification in which the sub-pixel in the second region is arrayed in another mode.

For example, in the pixels 114 in a second region 104 illustrated in FIG. 5A, as the array of the colors, a blue sub-pixel 113b in a pixel 112 of the first region 102 is replaced with a yellow sub-pixel 115y provided with a color filter Y that transmits yellow light.

According to this configuration, since the yellow image is displayed with all of the sub-pixels 115 within each pixel 114, it may be possible that the alert image 4y illustrated in FIG. 3B is displayed with the sufficiently high luminance to an extent that hardly sees through the forward scenery. It may be possible that the warning image 4r illustrated in FIG. 3C is displayed with the sufficiently high luminance (red close to vermilion) with the red sub-pixel 115 and the yellow sub-pixel 115 in each pixel 114.

Further, since the red image and the yellow image is displayed with the sufficient luminance, it may be possible that the color filter R is caused to have the characteristic displaying purer red or it may be possible that the color filter Y is caused to have the characteristic displaying purer yellow. Thus, it may be possible that the warning image 4r and the alert image 4y are displayed in a mode where the driver is likely to be aware of being warned or alerted.

Figure 5B:
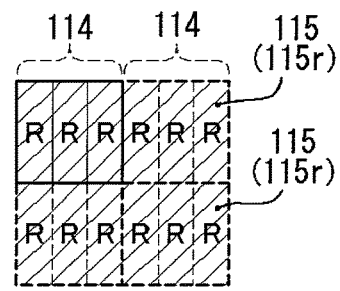
FIG. 5B is a diagram illustrating a second illustrative view of the first modification in which the sub-pixel in the second region is arrayed in another mode.

In the example illustrated in FIG. 5B, all of the sub-pixels 115 in each pixel 114 of the second region 104 are red sub-pixels 115r.

According to this configuration, since the red image with an extremely high luminance is displayed in the second region 104, it may be possible to display the warning image 4r in a mode that hardly sees through the forward scenery. When the color filter R has the characteristic that displays the purer red, it may be possible to display the warning image 4r in a mode where the driver is likely to be aware of being warned.

Figure 5C:
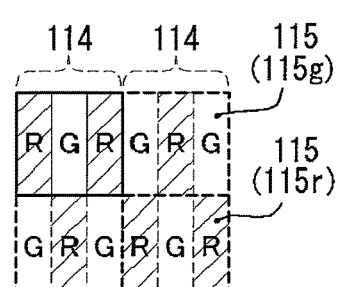
FIG. 5C is a diagram illustrating a third illustrative view of the first modification in which the sub-pixel in the second region is arrayed in another mode.

Alternatively, as illustrated in FIG. 5C, the colors may be arranged so that the red sub-pixels 115r and the green sub-pixels 115g are alternately arrayed. According to this configuration, since the second region 104 is occupied by the red sub-pixels 115r and the green sub-pixels 115g at a ratio of two halves, each of the sub-pixels 115r, 115g is higher in the ratio than that in the first region 102. Therefore, it may be possible to display the red image and the green image with a high luminance, and it may be possible to display the yellow image with a high luminance.

Since the red image and the green image are displayed with the high luminance, it may be possible to make the characteristic of the color filter R and the color filter G a characteristic that can display purer red or purer green. Thus, it may be possible to display the warning image 4r and the alert image 4y in a mode where the driver is likely to be aware of being warned or alerted. Further, in the green image, since a pure green image is displayed in a mode that hardly sees through the forward scenery, it may be possible to display the alert image 4y and the warning image 4r with the green image. In other words, the display mode, which hardly sees through the forward scenery and has the pure green, is clearly different from the display mode of the normal image displayed in the first region 102. Therefore, in this display mode, even when the green image is displayed, since the driver may immediately recognize the image, it may be possible to display the alert image 4y and the warning image 4r with the green image.

Figure 5D:
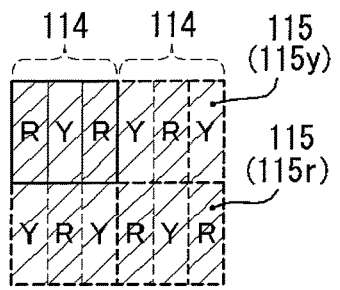
FIG. 5D is a diagram illustrating a fourth illustrative view of the first modification in which the sub-pixel in the second region is arrayed in another mode.

As illustrated in FIG. 5D, in the arrangement of the colors where the red sub-pixels 115r and the yellow sub-pixels 115y are alternately arrayed, it may be possible to display the red image and the yellow image with the high luminance to the extent that hardly sees through the forward scenery. Since the color filter R and the color filter Y have the characteristic that display the purer red or purer yellow, it may be possible to display the warning image 4r and the alert image 4y in a mode where the driver is likely to be aware of being warned or alerted.

(Second Modification)

In the above embodiment or the first modification, the array of the colors in the first region 102 where three colors of red, green, and blue are arranged is changed to the array of the colors approaching to red as a whole in the second region 104. The color array in the second region 104 may approach to green as compared with the color array of the first region 102.

Figure 6A:
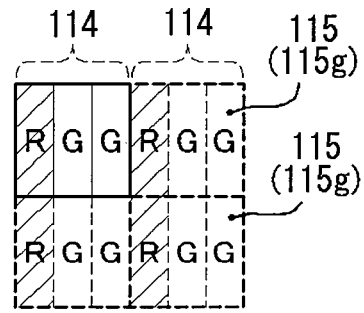
FIG. 6A is a diagram illustrating a first illustrative view of a second modification in which the arrangement of colors in each pixel in the second region is set to approach to green as compared with the arrangement of the colors in each pixel in the first region.
Figure 6B:
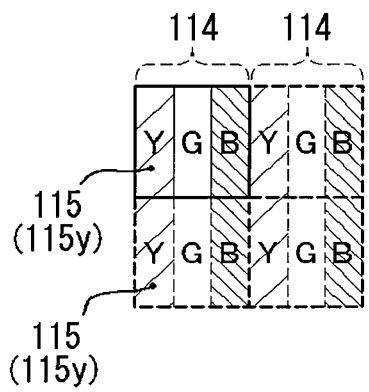
FIG. 6B is a diagram illustrating a second illustrative view of the second modification in which the arrangement of colors in each pixel in the second region is set to approach to green as compared with the arrangement of the colors in each pixel in the first region.
Figure 6C:
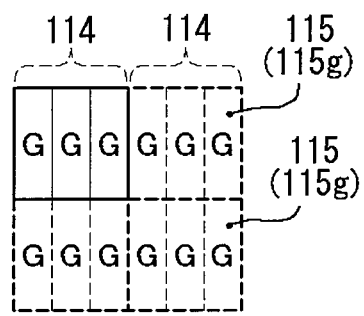
FIG. 6C is a diagram illustrating a third illustrative view of the second modification in which the arrangement of colors in each pixel in the second region is set to approach to green as compared with the arrangement of the colors in each pixel in the first region.

FIG. 6A to FIG. 6C illustrate an array of colors in pixel 114 of the second region 104 in a second modification.

For example, in the pixel 114 in the second region 104 illustrated in FIG. 6A, as the array of the colors, a blue sub-pixel 113b in a pixel 112 of the first region 102 is replaced with a green sub-pixel 115g. In FIG. 6B, as the array of the colors, a red sub-pixel 113r in the pixel 112 of the first region 102 is replaced with a yellow sub-pixel 115y. Further, in FIG. 6C, all of the sub-pixels 115 in each pixel 114 are replaced with the green sub-pixels 115g.

According to this configuration, in the second region 104, since the green image is displayed with the sufficiently high luminance, it may be possible display the green image in the mode that hardly sees through the forward scenery, with the projection of the image to the windshield 2. Since the image displayed in the mode that hardly sees through the forward scenery is clearly different from the display mode of the normal image displayed with the use of the first region 102, it may be possible for the driver to be immediately aware that the image is displayed. Even when the alert image 4y and the warning image 4r are displayed with green, it may be possible for the driver to be immediately aware that those images are displayed.

When a character image is displayed as the display image 4, on an empirical basis, it is known to easily read the green display. Thus, according to the second modification, it may be possible to display the character image in the mode where the driver easily reads the image.

In the second region 104 of the second modification, since the green image is displayed with the luminance higher than that of the first region 102, the characteristic of the color filter G may be different between the second region 104 and the first region 102.

Figure 7:
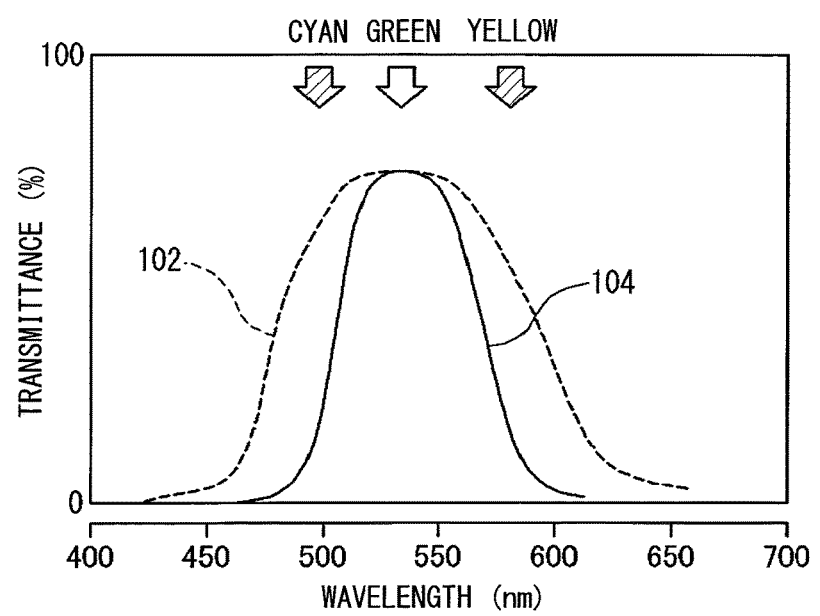
FIG. 7 is a diagram illustrating an illustrative view illustrating characteristics of a color filter in the first region and the second region of the second modification in comparison with each other.

FIG. 7 illustrates the characteristic of the color filter G in the second region 104 as compared with the characteristic of the color filter G in the first region 102. The color filter G for the first region 102 as indicated by a dashed line in FIG. 7 transmits not only the green light, but also a yellow light having a longer wavelength and a cyan light shorter in the wavelength than green. This is because the green image is displayed with the luminance as high as possible. The displayed green is little thin green rather than pure green.

A solid line in FIG. 7 indicates the color filter G for the second region 104. The color filter G for the second region 104 transmits the green light, but hardly transmits the yellow light and the cyan light. Accordingly, in the second region 104, since the image is displayed with pure green (green high in saturation), it may be possible to display the pure green image in the mode that hardly sees through the forward scenery, with the projection of the image to the windshield 2. By displaying the image in this mode, it may be possible for the driver to be aware that the image is displayed. Similarly, when the character image is displayed, it may be possible to display the image in the mode that the driver is further likely to read the image.

(Third Modification)

In the second modification, the color array of the second region 104 is set to a color array approaching to green as compared with the color array in the first region 102. The color array of the second region 104 may approach to blue as compared with the color array in the first region 102.

Figure 8A:
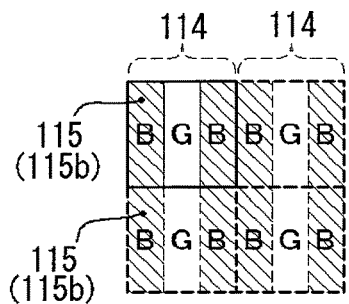
FIG. 8A is a diagram illustrating a first illustrative view of a third modification in which the arrangement of colors in each pixel in the second region is set to approach to blue as compared with the arrangement of the colors in each pixel in the first region.
Figure 8B:
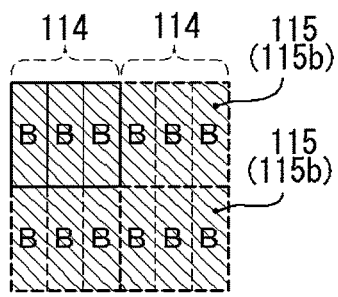
FIG. 8B is a diagram illustrating a second illustrative view of the third modification in which the arrangement of colors in each pixel in the second region is set to approach to blue as compared with the arrangement of the colors in each pixel in the first region.

FIG. 8A and FIG. 8B illustrate an array of colors in a pixel 114 of the second region 104 in the third modification.

For example, in the pixel 114 in the second region 104 illustrated in FIG. 8A, as the array of the colors, a red sub-pixel 113r in the pixel 112 of the first region 102 is replaced with a blue sub-pixel 115b. In FIG. 8B, all of the sub-pixels 115 in each pixel 114 are replaced with the blue sub-pixel 115b.

Accordingly, in the second region 104, since the blue image is displayed with sufficiently high luminance, the blue image is displayed in the mode that hardly sees through the forward scenery, with the projection of the image to the windshield 2. Since the image displayed in the mode that hardly sees through the forward scenery is clearly different from the display mode of the normal image displayed with the first region 102, it may be possible for the driver to be immediately aware that the image is displayed. Therefore, even when the alert image 4y and the warning image 4r are displayed with blue, it may be possible for the driver to be immediately aware that those images are displayed.

Since blue is a muted color tone as compared with red, yellow, and green, the driver is alerted or warned in a mode that does not excessively stimulate nerves of the driver.

In the second region 104 of the third modification, since the blue image is displayed with luminance higher than that of the first region 102, the characteristic of the color filter B may be different between the second region 104 and the first region 102.

Figure 9:
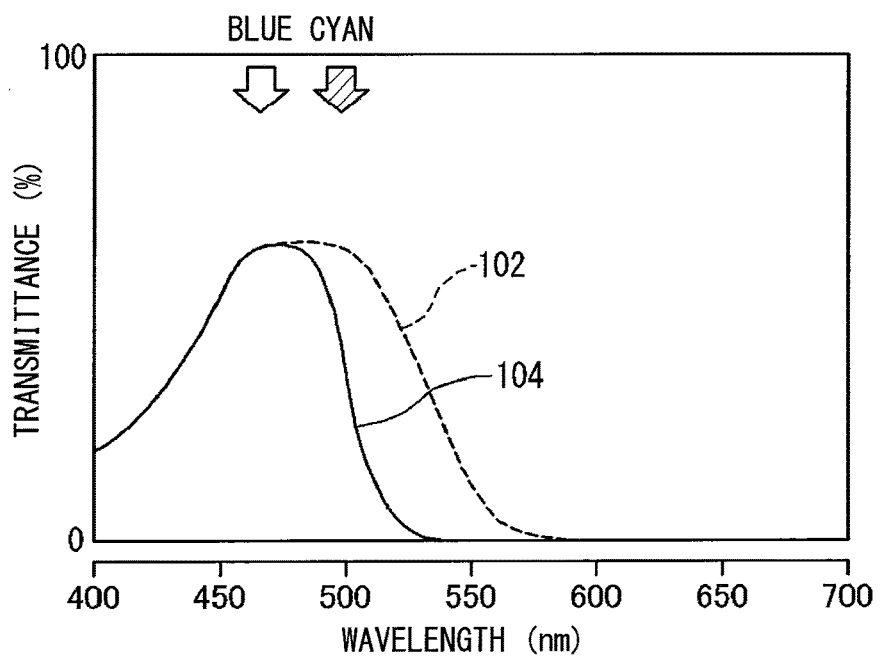
FIG. 9 is a diagram illustrating an illustrative view illustrating characteristics of a color filter in the first region and the second region of a third modification in comparison with each other.

FIG. 9 illustrates the characteristic of the color filter B in the second region 104 as compared with the characteristic of the color filter B in the first region 102. The color filter B for the first region 102 as indicated by a dashed line in FIG. 9 transmits not only the blue light, but also a cyan light having a longer wavelength. This is because the blue image is displayed with the luminance as high as possible. The displayed blue is blue slightly tinged with cyan.

By contrast, the color filter B for the second region 104 indicated by a solid line transmits the blue light, but hardly transmits the cyan light. According to this configuration, in the second region 104, since the image is displayed with pure blue (blue high in saturation), it may be possible to display the pure blue image in the mode that hardly sees through the forward scenery, with the projection of the image to the windshield 2.

By displaying the image in the above mode, it may be possible that the driver is further likely to be aware that the image is displayed. It may be possible to display the image in a mode that does not stimulate the driver's nerves with the display of the image with the pure blue.

(Fourth Modification)

In the embodiments and the various modifications described above, the second region 104 is disposed on the upper end of the image display surface 100. In the display image 4 in which the image of the image display surface 100 is projected to the windshield 2, as illustrated in FIG. 3A, FIG. 3B, and FIG. 3C, the image in the second region 104 is displayed on a lower portion of the display image 4.

The second region 104 may be disposed on an end of the image display surface 100. It may be unnecessary to be disposed to the upper portion of the image display surface 100.

Figure 10:
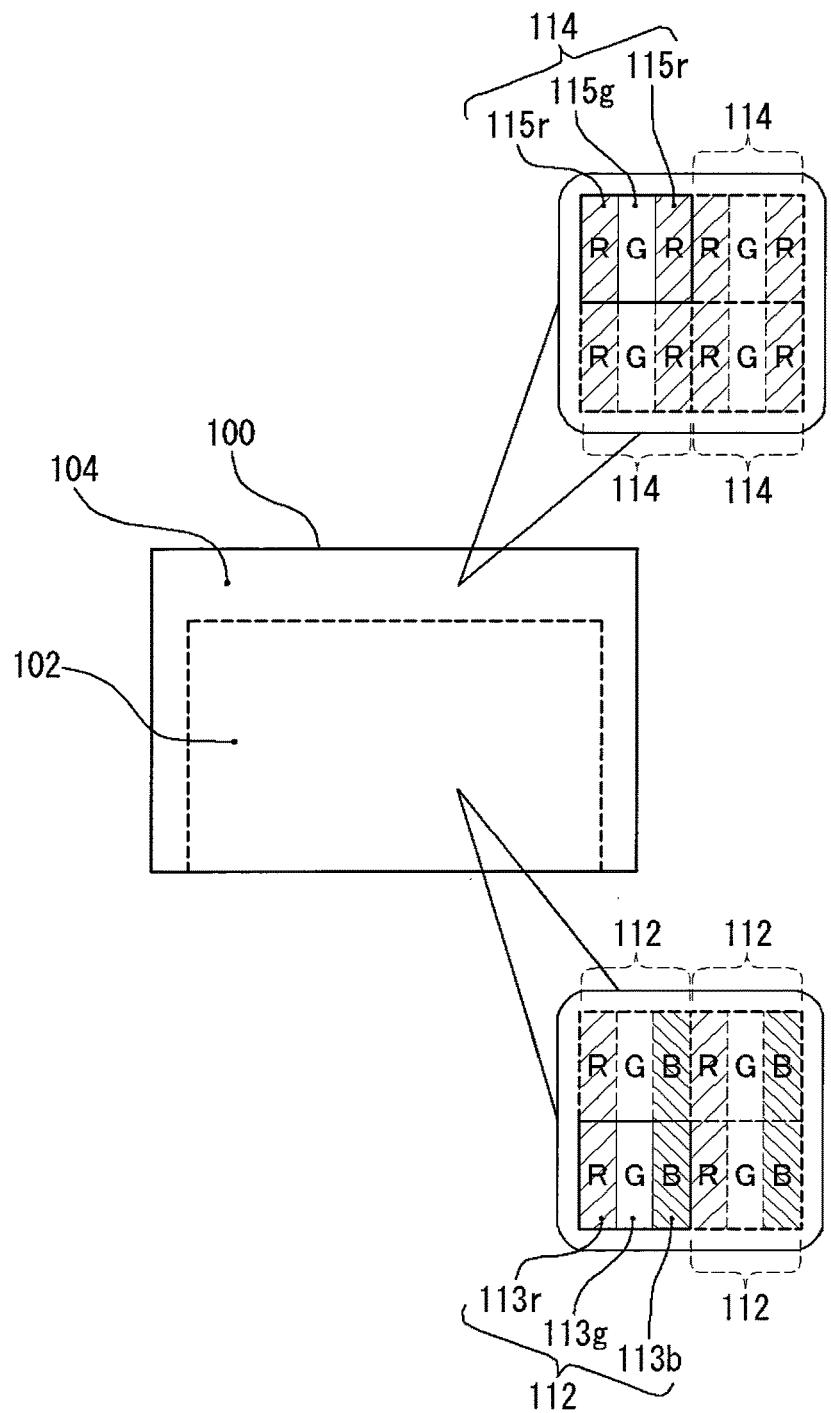
FIG. 10 is a diagram illustrating an illustrative view illustrating a fourth modification in which second regions are set on both of right and left ends of the image display surface.

FIG. 10 illustrates an image display surface 100 in the fourth modification in which second regions 104 are disposed on an upper end and both of right and left ends of the image display surface 100.

In the fourth modification, each pixel 112 in a first region 102 is provided with a red sub-pixel 113r, a green sub-pixel 113g, and a blue sub-pixel 113b. Each pixel 114 in the second region 104 is provided with two red sub-pixels 115r and one green sub-pixel 115g. Therefore, in the second region 104 in the fourth modification, the red image and the yellow image are displayed with the high luminance, and the red image and the yellow image are displayed in the mode that hardly sees through the forward scenery, with the projection of the image to the windshield 2.

Figure 11A:
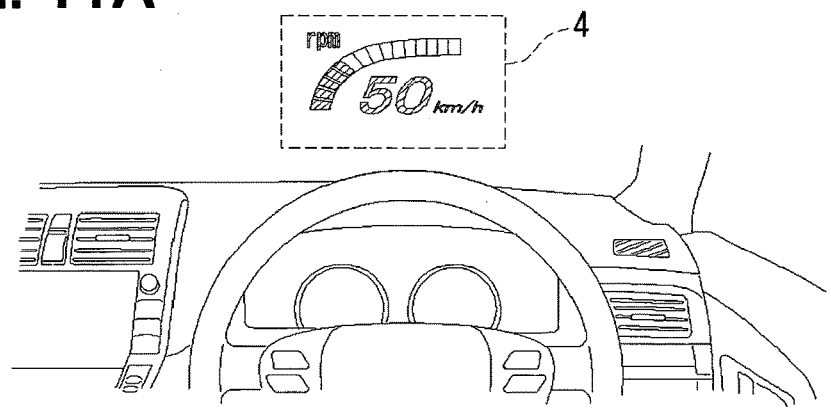
FIG. 11A is a diagram illustrating a first illustrative view illustrating a state in which an alert image or a warning image is displayed on a head-up display apparatus of a fourth modification.
Figure 11B:
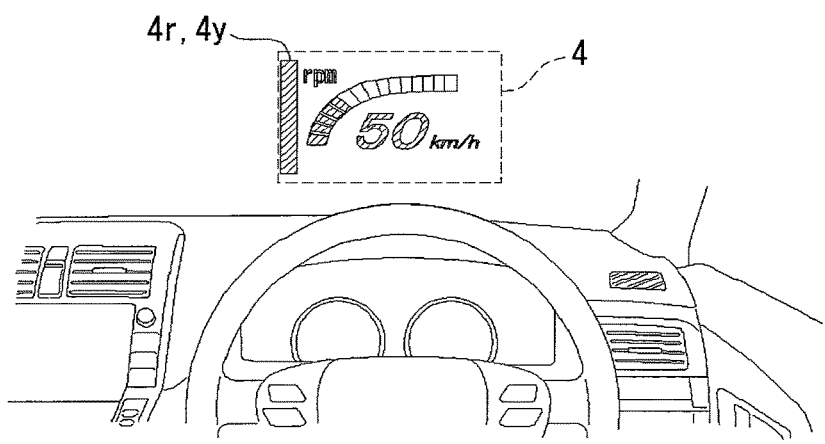
FIG. 11B is a diagram illustrating a second illustrative view illustrating a state in which the alert image or the warning image is displayed on the head-up display apparatus of the fourth modification.
Figure 11C:
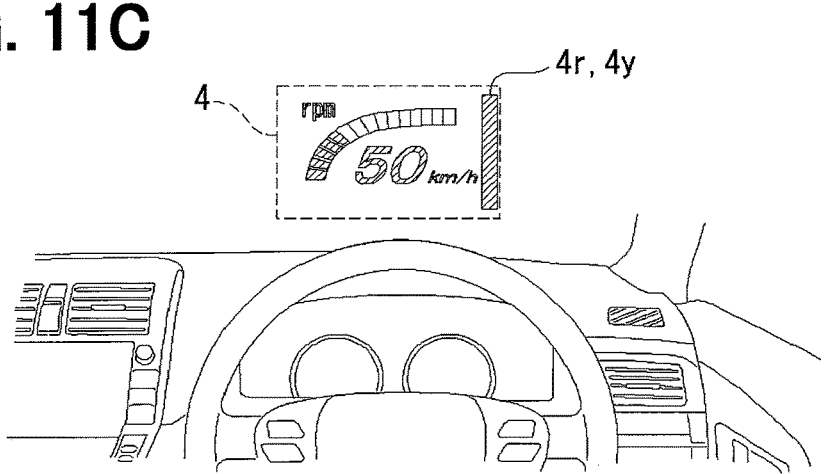
FIG. 11C is a diagram illustrating a third illustrative view illustrating a state in which the alert image or the warning image is displayed on the head-up display apparatus of the fourth modification.

FIG. 11A to FIG. 11C illustrate the display image 4 in the fourth modification. In a normal state, the image is displayed mainly with the first region 102, and an image illustrated in FIG. 11A is displayed. By contrast, when it is intended that the driver is alerted to or warned about a fact that an obstacle, another vehicle, or a pedestrian is present on a left side of the vehicle, the yellow alert image 4y or the red warning image 4r is displayed with the second region 104 on the left end of the image display surface 100.

FIG. 11B illustrates the alert image 4y or the warning image 4r that is displayed in this manner. Since the image displayed in this manner is displayed in the mode that hardly sees through the forward scenery, the driver may immediately recognize not the normal image but the image displayed for alert or warning. Since such an image is displayed on the left side, it may be possible for the driver to immediately recognize that the alert or warning about the obstacle on the left side of the vehicle is made.

When it is intended that the driver is alerted to or warned about an obstacle, another vehicle, or a pedestrian on a right side of the vehicle, the yellow alert image 4y or the red warning image 4r is displayed with the second region 104 on the right end of the image display surface 100.

FIG. 11C illustrates a state in which the alert image 4y or the warning image 4r is displayed in this manner. The image displayed in this manner is displayed in the mode that hardly sees through the forward scenery. Since such an image is displayed on the right side, it may be possible for the driver to immediately recognize the alert or warning about the obstacle present on the right side of the vehicle.

The present embodiment and the various modifications have been described above, but the present disclosure is not limited to the above embodiment and modifications, and can be variously implemented without departing from the spirit of the invention.

The head-up display apparatus according to the present disclosure includes a first region including a center position of an image display surface, and a second region other than the first region, in the image display surface that displays a color image to be projected to a transparent plate member. Each pixel in the first region includes a sub-pixel that displays red, a sub-pixel that displays green, and a sub-pixel that displays blue. Each pixel in the second region includes multiple sub-pixels that display colors having a color phase that is biased in at least any direction of a red direction, a green direction, and a blue direction from each pixel in the first region.

Since the sub-pixels that display red, green, and blue corresponding to three primary colors of a light are included in each pixel of the first region, those three primary colors are mixed together so that many colors are displayed. By contrast, since the unused sub-pixels are liable to be generated, there is a tendency that an image high in luminance is unlikely to be obtained. For example, when yellow is displayed, the sub-pixel that displays red and the sub-pixel that displays green are illuminated, and yellow is displayed. In this case, since the sub-pixel that displays blue is not used, the image high in luminance may be difficult to obtain. Each pixel in the second region includes the sub-pixels that display the colors having the color phase biased in at least any direction of the red direction, the green direction, and the blue direction from each pixel in the first region. Thus, the kinds of displayable colors are reduced as compared with the first region. When the color in the direction along which the color phase is biased is displayed, since the unused sub-pixels are likely to be generated, it may be possible to display the image high in luminance in the second region. Accordingly, in displaying the image for warning or alert to the driver, the image high in luminance is displayed in the second region, and the image is projected to the transparent plate member in front of the driver seat. According to this configuration, since the image is displayed in a mode clearly different from a case in which the image displayed in the first region is projected, it may be possible for the driver to be immediately aware that the image is displayed for any warning or alert.

In this head-up display apparatus according to the present disclosure, each pixel in the second region may include the sub-pixel for displaying red and the sub-pixel for displaying green.

According to this configuration, the colors in each pixel of the second region are biased in a color phase in a direction of red or green with respect to the colors in each pixel of the first region. The image of red, green or yellow obtained by mixture of those colors may be displayed in a mode different from that when the image is displayed with the use of the first region. Therefore, when the image for warning or alerting the driver is set as a red, green, or yellow image, such an image is displayed in the second region with result that the image may be displayed in the mode that the driver is immediately aware of the image for warning or alert.

In the head-up display apparatus according to the present disclosure, in the array of the sub-pixels in each pixel of the second region, the sub-pixel for displaying blue in each pixel of the first region may be replaced with the sub-pixel for displaying red.

According to this configuration, each pixel in the second region includes two sub-pixels for displaying red, and one sub-pixel for displaying green. Since the red image is displayed with two sub-pixels per pixel, the red image may be displayed with the high luminance. Since the yellow image is displayed with the use of two sub-pixels for displaying red and one sub-pixel for displaying green, the yellow image may also be displayed with the high luminance. Therefore, when the image for warning or alerting the driver is set as a red or yellow image, such an image is displayed in the second region with result that the image may be displayed in the mode that the driver is immediately aware of the image for warning or alert.

In the head-up display apparatus according to the present disclosure, the sub-pixels in the second region may display the color higher in saturation than the sub-pixels in the first region.

The sub-pixel displays the color by limiting the wavelength of the light transmitted by each color filter. When a wavelength range of the transmitted light is narrowed, the color high in saturation is displayed. The luminance of the displayed image may be lowered as much as the amount of transmitted light is reduced. With a reduction in the luminance of the image, there may be a tendency that the projected image is difficult to see when the image is projected to the transparent plate member in front of the driver. However, since the image high in the luminance is displayed in the second region, the image is not difficult to see even when the wavelength range of the light transmitted by the color filter is narrowed. By displaying the image with the color high in the saturation, it may be possible for the driver to be aware that the image is displayed for any warning or alert.

In the head-up display apparatus according to the present disclosure, the second region may include positions of at least the right end and the left end of the image display surface.

According to this configuration, the image for any warning or alert may be displayed on the left side or the right side of the driver. Thus, not only warning or alert are merely performed, but also the driver may be informed that a warning is given against any one of the right side and the left side.

While the embodiments and constructions according to the present disclosure have been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A head-up display apparatus comprising:
an image display surface that displays a color image by a plurality of pixels, each of the pixels being divided into sub-pixels,
wherein:
the color image displayed on the image display surface is projected to a transparent plate member that is provided in front of a driver seat, and the color image is displayed superimposed to a forward scenery of the transparent plate member;
the image display surface includes
a first region that includes a center position of the image display surface, and
a second region excluding the first region;
each of the pixels in the first region includes a sub-pixel displaying red, a sub-pixel displaying green, and a sub-pixel displaying blue equally;
the second region has a hue different from a hue of the first region;
the pixels in the second region include a sub-pixel displaying red and a sub-pixel displaying yellow, a plurality of pixels in which a total number of the sub-pixel displaying red is greater than a total number of the sub-pixel displaying yellow, wherein the sub-pixel displaying red and the sub-pixel displaying yellow have a ratio of 1:1 or greater;
a transmittance provided in the sub-pixel displaying red in the first region exceeds 50% at 600 nm; and
a transmittance provided in the sub-pixel displaying red in the second region is less than 50% at 600 nm.

2. The head-up display apparatus according to claim 1, wherein:
the each of the pixels in the second region includes the sub-pixel displaying red at a position corresponding to the sub-pixel displaying blue in the pixel in the first region.

3. The head-up display apparatus according to claim 1, wherein:
the each of the sub-pixels in the second region displays color higher in saturation than saturation of the each of the sub-pixels in the first region.

4. The head-up display apparatus according to claim 1, wherein:
the second region includes a position of at least a left end and a right end in the image display surface.

5. The head-up display apparatus according to claim 1, wherein:
the image display surface includes corner portions and the second region extends from the corner portions.

6. The head-up display apparatus according to claim 1, wherein:
the second region is entirely disposed in an upper portion of the image display surface.

* * * * *